Inventor
Frank L. Holford

Patented May 19, 1953

2,638,780

UNITED STATES PATENT OFFICE 2,638,780

STRAIN MEASURING CIRCUIT

Frank L. Holford, Towson, Md., assignor to The Black & Decker Manufacturing Company, a corporation of Maryland Application April 5, 1948, Serial No. 18,889

14 Claims. (Cl. 73—88.5)

1

The present invention relates to a circuit for measuring the deflection of a magnetic strain gage. The magnetic coil or coils of the gage are attached to the member, such as a scale, on which an object is being weighed and they have an armature near them which moves with the variations of weight on the scale and thereby changes in the magnetic flux of the coil or coils take place which are in proportion to the weight placed upon the scale.

Among the objects of the present invention are to provide a circuit having high sensitivity and high stability.

Another object is to provide a circuit in which there is little or no distortion of the metered readings arising from "phasing out" a large residual alternating current bridge output voltage due to unmatched voltage phases in the parallel legs of the bridge at varying conditions of apparent balance. Another object of the invention is to eliminate the effects of rectifier drift upon the metered readings at balance. Another object of the invention is the elimination of the effects of non-linear rectifier characteristics upon the metered readings at balance. Another object of the invention is the elimination of the effects of unmatched rectifiers upon the metered readings at balance.

Another object of the invention is the compensation for the curvature of voltage differential as a function of the magnetic strain gage movement arising from the basic behavior of that gage as applied to the particular scale in question, in order to obtain linear metering results when balancing the strain gage bridge with a linearly calibrated potentiometer.

In meeting the above objects it is essential to have economy and simplicity for manufacturing and for calibrating purposes and the components must be rugged and insensitive and possess a latitude of operating tolerances which except for the strain gage and calibrated potentiometer, can be met by standard manufactured stock parts.

The above and other objects and advantages of the invention will be apparent from the following description taken in connection with the accompanying drawings forming a part hereof and in which.

Figures 1, 2, 3, 4:
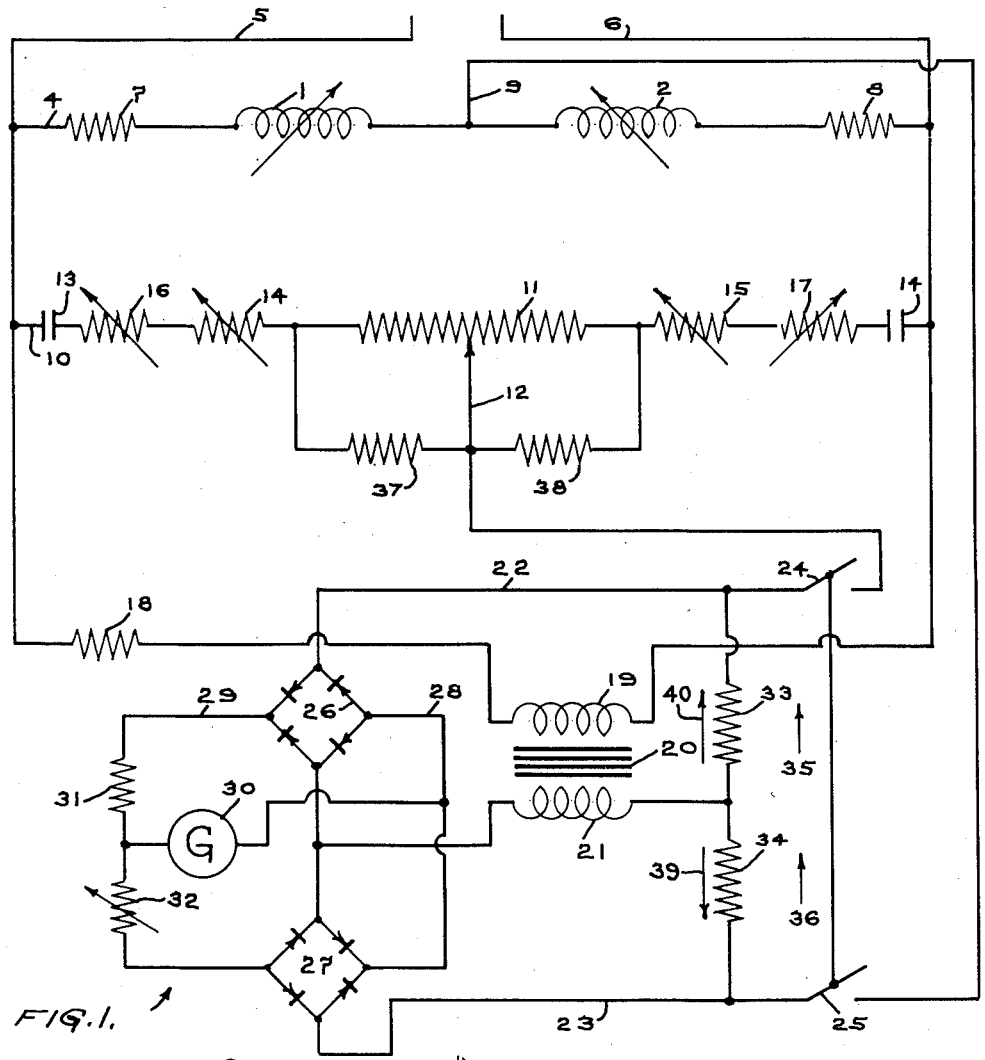
Figure 1 illustrates a circuit embodying the principles of this invention.
Figure 2 is a vector diagram of characteristics of branch 4, in relation to the phase angle of the current $I_4$ flowing in that branch.
Figure 3 is a vector diagram of characteristics of branch 10, in relation to the phase angle of the current $I_{10}$ flowing in that branch.
Figure 4 is a sectional view of part of a scale showing the inductors or inductive reactances of the instant invention.

The circuit is illustrated in connection with the scale shown in Figure 35 of the application of James N. Baker filed January 10, 1945, Serial No. 572,179. Further details of the operation of the scale proper will be apparent in that application.

As shown in the drawings two electro-magnetic coils having cores therein, 1 and 2 are placed one above and the other beneath a moving armature 3. The electro-magnetic coils or inductors are fixed in the scale and the armature 3 moves in direct proportion to the load upon the scale, so that the magnetic flux of the two coils varies as nearly as possible in direct proportion to the load on the scale and it is to the measurement of this variable flux that the instant invention is directed. The coils or inductors 1 and 2 are shown in Figure 1 as being opposite legs of branch 4 of a bridge circuit energized from an alternating current source 5—6 and in the branch 4 with these inductors 1 and 2 are fixed resistances 7 and 8 respectively, which represent the resistance components of the leads and inductance coils of the gage. An output terminal 9 in branch 4 is placed between the inductors 1 and 2.

The bridge circuit has the second branch 10 having in its center, the calibrated metering potentiometer 11 with the movable arm 12, the potentiometer being in the other two legs of the bridge.

The other components of this branch 10 are the phase compensating condensers 13 and 14, the zero setting variable resistances 14 and 15 ganged or connected together in opposition, that is, so that when the resistance 14 is increased the resistance 15 is simultaneously decreased and vice versa. This branch also includes the variable resistances 16 and 17 which are ganged or connected together in tandem, that is so that when one is increased the other is simultaneously increased. The purpose of these latter resistances is to calibrate the bridge circuit so that the readings on the potentiometer will measure the changes in flux in the inductors in units of physical force, or pounds. The zero setting resistances are to adjust the two branches 4 and 10 to balance when the scale and the potentiometer are at zero. The potentiometer arm 12 constitutes the other output terminal of the bridge consisting of the two branches 4 and 10.

The alternating current source 5—6 passes through additional resistance 18 to the primary coils or windings 19 of isolation transformer 20. The secondary coils or windings 21 of this transformer place what may be called a "standing" or "polarizing" alternating current, of which an instantaneous value is shown to be moving in the direction of the arrows 39 and 40, upon a double balance indicating circuit 22—23 and which may be connected by double switch 24—25 with the output terminals of the bridge circuit 12 and 9 respectively. The switch 24—25 is intended to be closed for initially balancing the bridge circuit and to take a reading of weight.

The standing current on this double balance indicating circuit 22—23 maintained by the transformer 20 through its secondary coil 21 forming the third and common conductor for this double circuit, passes through two full wave rectifiers 26 and 27. These two rectifiers are connected in series on their direct current side by conductors 28 and 29 and midway between each of these conductors, points of equal potential, galvanometer 30 is connected. Conductor 29 connecting the galvanometer with rectifier 26 has fixed resistance 31 therein and the same conductor connecting the galvanometer with rectifier 27 has variable resistance 32 therein. The two rectifiers 26 and 27 are arranged in parallel with the secondary 21 of the transformer 20 as shown. The standing or exciting current in the circuit 22—23 is held to a very low value by the high resistance 18 in the primary of the transformer and by resistances 33 and 34 in the respective branches of the indicating circuit 22—23 in the secondary. Because of this very low value vagarious changes in its magnitude become insignificant relative to the bridge output voltages subsequently impressed upon it.

The galvanometer 30 is kept at zero reading with the switches 24 and 25 open by adjustment of the variable resistance 32. After this adjustment to balance is made any unbalanced voltage impressed upon the circuit 21, 22 and 23 from the output terminals 9 and 12 of the bridge will cause a current to flow in this double balance indicating circuit, of which current an instantaneous value is indicated in the direction of the arrows 35, 36 for one condition of unbalance. This current adds to the current in resistance 33 and increases the voltage on rectifier 26 and subtracts from the current in resistance 34 and decreases the voltage on rectifier 27. The galvanometer connections with conductors 28 and 29 are no longer points of equal potential and the galvanometer will swing off zero in one direction. If the arm 12 of the potentiometer is adjusted to the opposite side of balance, after the bridge circuit was adjusted to zero position by the zero setting resistances 14 and 15 with the armature 3 being in position of no load, thereby reversing the voltage between output terminals 9 and 12 with respect to the standing current on the circuit 21, 22 and 23, the change of potential through the galvanometer will be in the opposite direction, and the galvanometer will swing in the opposite direction. When the bridge is balanced and the voltage between the output terminals 9 and 12 is zero, or when the residual voltage at these terminals is 90° out of phase with the standing excitation of the circuit 21, 22, 23 there will be no change in the values, or relative values, of the standing current, and the galvanometer will give no indication in either direction.

The addition of condensers 13 and 14 to the legs of resistance branch 10 of the bridge corrects the phases of the bridge legs so that the residual output voltage is completely or very nearly eliminated. This corrects distortion due to phasing out the residual output voltage because the total inductive reactance of the coils 1 and 2, remaining substantially constant, is paralleled by the total resistance of the calibrated metering potentiometer remaining substantially constant. This may be seen from the vector diagrams of Figures 2 and 3, the relative phase angles of the voltages across the components of the branches 4 and 10 are shown. In Figure 2 the voltage phase $I_{41}$, $I_{42}$ is seen to lead the supply voltage $V_4$ by an angle M depending upon the relative fixed resistance values of the inductors or inductance coils 1 and 2, while the interchange of voltage between these two coils as the strain gage is moved corresponds to a moving point A vertically upon the total inductive-reactance vector. Similarily, see Figure 3, when fixed condensers are added to branch 10, the voltage phase across the potentiometer and the other total resistances, $I_{10}R$ is seen to lead the supply voltage $V_{10}$ by an angle N, depending upon the value of the condensers added. Adjusting the potentiometer corresponds to moving point B horizontally upon the resistance vector.

The supply voltage $V_4$ and $V_{10}$ for each diagram is the same voltage and if the vector diagram of Figure 3 be rotated and superimposed upon its equivalent Figure 2, then it will be seen that the two diagrams may be made to coincide exactly throughout, so that points A and B will exactly coincide for all positions of balance if the correct condenser values are chosen. There will therefore be no residual voltage between output terminals 9 and 12 and true balance will occur.

The magnetic strain gage above described superimposes upon a straight line relationship between voltage interchange between coils and dimensional displacement a concave curve of increasing voltage interchange for each interval of displacement. This curve arises from a combination of uncontrolled air gap loss, fringing at the air gaps, permeability curves for iron, and inductance-resistance ratios of the coils. This is compensated for by selecting resistances 37 and 38 and adding them to the circuit between zero setting resistances 14 and 15 and potentiometer arm 12. These resistances have their value determined by experiment, they may be termed bleeder resistances, and their action is to add a pair of concave reciprocal curves to the straight line behavior of the linearly calibrated metering potentiometer, effecting a straight line relationship between gage displacement and potentiometer adjustment. This modification obviates the need for a calibrated non-linear dial in connection with the linear potentiometer.

In operation, with the switches 24 and 25 open the circuits 21, 22 and 23 are balanced through movement of the variable resistance 32 and these circuits may always be tested for balance in this manner. The bridge circuit in the position of no load may always similarly be tested for balance by closing the switches 24 and 25 and with the potentiometer arm 12 in the zero position, by adjusting the zero setting resistances 14 and 15. With the bridge circuit thus balanced the load is placed upon the scale and with the switches 24 and 25 closed the reading of the galvanometer 30 is again brought back to balance by movements of the potentiometer arm 12 in the required direction. The weight of the load is thereupon determined by the displacement of the potentiometer arm 12 from its zero position. And if it is desired to again check the balance of the metering circuit 21, 22 and 23 this may be done by opening the switches 24 and 25.

It will be seen that high sensitivity of the circuit is provided because the output voltage of the bridge is impressed upon an indicating circuit in which its effect operates upon the two full wave rectifiers to increase the output of one and decrease the output of the other, doubly destroying a pre-existing balanced condition.

High stability is provided by holding the standing currents in the indicating circuits to the minimum operable value and by providing continuously adjustable balance of the indicating circuit when the switches 24 and 25 are open.

Distortion due to phasing-out is eliminated as above described in connection with the condensers 13 and 14.

Rectifier drift can have no effect upon the indication of balance since the rectifiers operate in an isolated indicating circuit which is continuously adjustable independently of the bridge circuit.

Non-linear rectifier characteristics can have no effect upon the indicated point of bridge balance because the rectifiers operate at constant excitation level for all positions of balance, and no utilization of rectifier output functions to determine the magnitude of unbalance.

Unmatched rectifiers can have no effect upon the indication of balance, as no metering or measuring of rectifier output is attempted.

Compensation for the non-linear behavior of the magnetic strain gage is accomplished by the addition of the resistances 37 and 38 as above described.

Having described the invention in its preferred embodiment, it is of course understood that it is not limited to the precise construction shown, but may be modified by one skilled in the art.

What is claimed as new and is desired to be secured by Letters Patent is:

1. A strain gage circuit comprising a bridge circuit, having two output terminals, a pair of inductors whose relative inductance values are varied in accordance with the strain to be measured in one branch of said circuit, one on each side of one output terminal of said circuit, a source of alternating current for energizing said bridge circuit, a sliding arm potentiometer in the other branch of said circuit, comprising the other two legs of said circuit, the sliding arm of which constitutes the other output terminal of said circuit, a two branch balanced indicating circuit comprising a common conductor and two branches connected in parallel across the common conductor, a transformer energizing the common conductor in the balanced indicating circuit from the source of alternating current, a rectifier bridge in each branch of the balanced indicating circuit having their output terminals connected in series and a current responsive instrument connected between their respective output terminals, means to impress an added current on said two branch balanced circuit when said bridge circuit is unbalanced comprising a pair of impedance elements, one in each branch of the indicating circuit, said elements being series connected across the output terminals of said bridge circuit to indicate a change in the values of the inductors when the gage is placed under strain.

2. The circuit of claim 1 in which the bridge circuit has between each conductor of the source of alternating current and each inductor, a fixed resistance, and between each said conductor and the potentiometer, a zero setting resistance, the two zero setting resistances being ganged in opposition.

3. The circuit of claim 1 in which the bridge circuit has between each conductor of the source of alternating current and the potentiometer a phase compensating condenser.

4. The circuit of claim 1 in which the gage has non-linear behavior characteristics, and in addition, the circuit includes two separate resistances, one placed on each side of the poteniometer arm, between the arm and the connection of the potentiometer resistance to the source of alternating current, to correct the non-linear behavior of the gage.

5. The circuit of claim 1 in which two resistances are placed in the direct current circuit from the rectifiers, one on each side of the connections to the current responsive instrument, one of said resistances being variable in order to balance the direct current circuit.

6. A strain gage circuit comprising a bridge circuit having two output terminals, a pair of inductors whose relative inductance values are varied in accordance with the strain to be measured in one branch of said circuit, one on each side of one output terminal of said circuit, a source of alternating current for energizing said bridge circuit, a sliding arm potentiometer in the other branch of said circuit, comprising the other two legs of said circuit, the sliding arm of which constitutes the other output terminal of said circuit, means, other than the potentiometer, to balance the bridge circuit, a two branch balanced indicating circuit comprising a common conductor and two branches connected in parallel across the common conductor, a transformer energizing the common conductor in the balanced indicating circuit from the source of alternating current, a rectifier bridge in each branch of the balanced indicating circuit having their output terminals connected in series and a current responsive instrument connected between their respective output terminals, means to impress an added current on said two branched balanced circuit when said bridge circuit is unbalanced comprising a pair of impedance elements, one in each branch of the indicating circuit, said elements being series connected across the output terminals of said bridge circuit to indicate a change in the values of the inductors when the gage is placed under strain, whereby the change in values of the inductors may be determined on the potentiometer by balancing the bridge circuit by movements of the potentiometer arm with the added current impressed on the two branch balanced circuit.

7. The circuit of claim 6 in which the bridge circuit has between each conductor of the source of alternating current and the potentiometer a variable resistance to calibrate the potentiometer to show changes in values of the inductors in units of physical force, the two resistances being ganged in tandem.

8. A strain gage circuit in which the gage has non-linear behavior characteristics comprising a bridge circuit having two output terminals, a pair of inductors whose relative inductance values are varied in accordance with the strain to be measured in one branch of said circuit, one on each side of one output terminal of said circuit, a source of alternating current for energizing said bridge circuit, a sliding arm potentiometer in the other branch of said circuit comprising the other two legs of said circuit, the sliding arm of which constitutes the other output terminal of said circuit, a current responsive instrument, a transformer having its primary windings connected to the alternating current source, an indicating circuit, comprising two branch circuits including two conductors connectible respectively with the two output terminals of the bridge circuit, a rectifier bridge in each branch circuit, the transformer secondary windings being connected to both of said conductors and between said rectifier bridges to constitute a common conductor for the two branch circuits, the output terminals of the rectifier bridges being connected in series and the current responsive instrument being connected between their respective output terminals, impedance elements between said secondary windings and each of their said connections to the said two conductors, means to impress the current from the output terminals of the bridge circuit upon said two conductors of the indicating circuit to indicate the unbalance of said bridge circuit, two separate resistances, one placed on each side of the potentiometer arm, between the arm and the connection of the potentiometer resistance to the source of alternating current, to correct the non-linear behavoir of the gage.

9. A strain gage circuit comprising a bridge circuit having two output terminals, a pair of inductors whose relative inductance values are varied in accordance with the strain to be measured in one branch of said circuit, one on each side of one output terminal of said circuit, a source of alternating current for energizing said bridge circuit, a sliding arm potentiometer in the other branch of said circuit comprising the other two legs of said circuit, the sliding arm of which constitutes the other output terminal of said circuit, a current responsive instrument, a transformer having its primary windings connected to the alternating current source, an indicating circuit, comprising two branch circuits including two conductors connectible respectively with the two output terminals of the bridge circuit, a rectifier bridge in each branch circuit, the transformer secondary windings being connected to both of said conductors and between said rectifier bridges to constitute a common conductor for the two branch circuits, the output terminals of the rectifier bridges being connected in series and the current responsive instrument being connected between their respective output terminals, impedance elements between said secondary windings and each of their said connections to the said two conductors, means to impress the current from the output terminals of the bridge circuit upon said two conductors of the indicating circuit to indicate the unbalance of said bridge circuit, means other than the potentiometer to adjust the bridge circuit to show a balanced current through the instrument, means to adjust the indicating circuit to show a balanced current through the instrument when the bridge circuit is disconnected therefrom, whereby the strain on the gage may be measured on the potentiometer, by returning the instrument to zero reading by adjustment of the potentiometer arm.

10. The circuit of claim 9 in which the bridge circuit has between each conductor of the source of alternating current and each inductor, a fixed resistance, and between each said conductor and the potentiometer, a zero setting resistance, the two zero setting resistances being ganged in opposition.

11. The circuit of claim 9 in which the bridge circuit has between each conductor of the source of alternating current and the potentiometer a variable resistance to calibrate the potentiometer to show changes in values of the inductors in units of physical force, the two resistances being ganged in tandem.

12. The circuit of claim 9 in which the bridge circuit has between each conductor of the source of alternating current and the potentiometer a phase compensating condenser.

13. A strain gage circuit in which the gage has non-linear behavior characteristics comprising a bridge circuit having two output terminals, a pair of inductors whose relative inductance values are varied in accordance with the strain to be measured in one branch of said circuit, one on each side of one output terminal of said circuit, a source of alternating current for energizing said bridge circuit, a sliding arm potentiometer in the other branch of said circuit comprising the other two legs of said circuit, the sliding arm of which constitutes the other output terminal of said circuit, a current responsive instrument, a transformer having its primary windings connected to the alternating current source, an indicating circuit comprising two branch circuits including two conductors connectible respectively with the two output terminals of the bridge circuit, a rectifier bridge in each branch circuit, the transformer secondary windings being connected to both of said conductors and between said rectifier bridges to constitute a common conductor for the two branch circuits, the output terminals of the rectifier bridges being connected in series and the current responsive instrument being connected between their respective output terminals, impedance elements between said secondary windings and each of their said connections to the said two conductors, means to impress the current from the output terminals of the bridge circuit upon said two conductors of the indicating circuit to indicate the unbalance of said bridge circuit, means other than the potentiometer to adjust the bridge circuit to show a balanced current through the instrument, means to adjust the indicating circuit to show a balanced current through the instrument when the bridge circuit is disconnected therefrom, whereby the strain on the gage may be measured on the potentiometer, by returning the instrument to zero reading by adjustment of the potentiometer arm, two separate resistances, one placed on each side of the potentiometer arm, between the arm and the connection of the potentiometer resistance to the source of alternating current, to correct the non-linear behavior the gage.

14. A strain gage circuit comprising a bridge circuit having two output terminals, a pair of inductors whose relative inductance values are varied in accordance with the strain to be measured in one branch of said circuit, one on each side of one output terminal of said circuit, a source of alternating current for energizing said bridge circuit, a sliding arm potentiometer in the other branch of said circuit, comprising the other two legs of said circuit, the sliding arm of which constitutes the other output terminal of said circuit, a two branch indicating circuit comprising a common conductor and two branches connected in parallel across the common conductor, a transformer energizing the common conductor in the indicating circuit from the source of alternating current, a rectifier bridge in each branch of the indicating circuit having their output terminals connected in series and a current responsive instrument connected between their respective output terminals, two resistances in the direct current circuit from the rectifiers, one on each side of the connections to the current responsive instrument, one of said resistances being variable in order to balance the direct current circuit, means to adjust the indicating circuit to show a balanced current through the instrument when the bridge circuit is disconnected therefrom said thereby to balance both branches of the indicating circuit, means to impress an added current on said two branch balanced circuit when said bridge circuit is unbalanced comprising a pair of impedance elements, one in each branch of the indicating circuit, said elements being series connected across the output terminals of said bridge circuit to indicate a change in the values of the inductors, and means other than the potentiometer to adjust the bridge circuit to show a balanced current through the instrument, whereby the strain on the gage may be measured on the potentiometer, by returning the instrument to zero reading by adjustment of the potentiometer arm.

FRANK L. HOLFORD.

References Cited in the file of this patent

UNITED STATES PATENTS

| Number | Name | Date |
| --- | --- | --- |
| 2,240,184 | Hathaway | Apr. 29, 1941 |
| 2,338,732 | Nosker | Jan. 11, 1944 |
| 2,445,880 | Hathaway | July 27, 1948 |
| 2,457,165 | McNamee | Dec. 28, 1948 |

FOREIGN PATENTS

| Number | Country | Date |
| --- | --- | --- |
| 730,790 | France | May 23, 1932 |

OTHER REFERENCES

Publication entitled "Strain Gages," in Electronics, December 1943, pages 106–111 and 192.